United States Patent

Dowty et al.

Patent Number: 5,396,807
Date of Patent: Mar. 14, 1995

[54] MEANS TO DETERMINE LIQUID FLOW RATE WITH GAS PRESENT

[75] Inventors: Earl L. Dowty, Katy; Gregory J. Hatton, Kingwood, both of Tex.

[73] Assignee: Texaco Inc., White Plains, N.Y.

[21] Appl. No.: 260,277

[22] Filed: Jun. 14, 1994

[51] Int. Cl.⁶ ............................................. G01F 1/74
[52] U.S. Cl. .................................................. 73/861.04
[58] Field of Search ............................ 73/200, 861.04

[56] References Cited

U.S. PATENT DOCUMENTS

| | | | |
|---|---|---|---|
| 5,007,293 | 4/1991 | Jung | 73/861.04 |
| 5,036,710 | 8/1991 | King | 73/200 X |
| 5,127,272 | 7/1992 | Dean et al. | 73/861.04 |

Primary Examiner—Herbert Goldstein
Attorney, Agent, or Firm—Kenneth R. Priem; James L. Bailey

[57] ABSTRACT

The gas flow rate and liquid flow rate of a two phase fluid flow are determined by passing the fluid flow down an inclined pipe to stratify the flow. The fluid pressure, temperature and density are measured along with the liquid density. The differential pressure is measured to determine the dynamic head of the fluid. These measurements are used together to determine the gas flow rate and the liquid flow rate.

2 Claims, 1 Drawing Sheet

MEANS TO DETERMINE LIQUID FLOW RATE WITH GAS PRESENT

BACKGROUND OF THE INVENTION

1. The Field of the Invention

The present invention pertains to a means and method for determining the liquid flow rate and gas flow rate of a fluid mixture containing these two phases.

2. The Prior Art

A fundamental measurement required in many industries is the measurement of the flow of liquids and gases and a determination of their respective rates of flow. Special consideration is being directed, by sectors of the oil industry interested in the development of sub sea production technology, to liquid rate meters which are passive (i.e. have no moving parts) and offer high reliability, availability and proven performance. The innovative recognition of gas-liquid stratification that occurs in a downwardly inclined section of flow line has led to several means for measuring the liquid and gas flow rates. These means have generally included active components, i.e. components with moving parts. Example of this type of apparatus can be found in U.S. Pat. Nos. 4,660,414; 4,760,742; 5,048,348; 5,127,272; and 5,195,380, all owned by the common assignee and the disclosures of which are incorporated herein by reference. The present invention is also based on the use of a downwardly inclined section of a flow line, but is totally passive and makes use of components of proven reliability, availability and performance.

SUMMARY OF THE INVENTION

The liquid and gas flow metering device of the present invention is completely passive (i.e. has no moving parts), operates over a broad range of flow rates and conditions, is suitable for high operating pressures (e.g. greater than 3600 psia), introduces negligible pressure losses, can be used subsurface as well as on the surface, and has a self draining configuration which does not trap fluids or entrained solids when the system is shut in.

BRIEF DESCRIPTION OF THE DRAWINGS

The present invention will be described, by way of example, with reference to the accompanying drawings in which.

DETAILED DESCRIPTION OF THE PREFERRED EMBODIMENT

Figure 1:
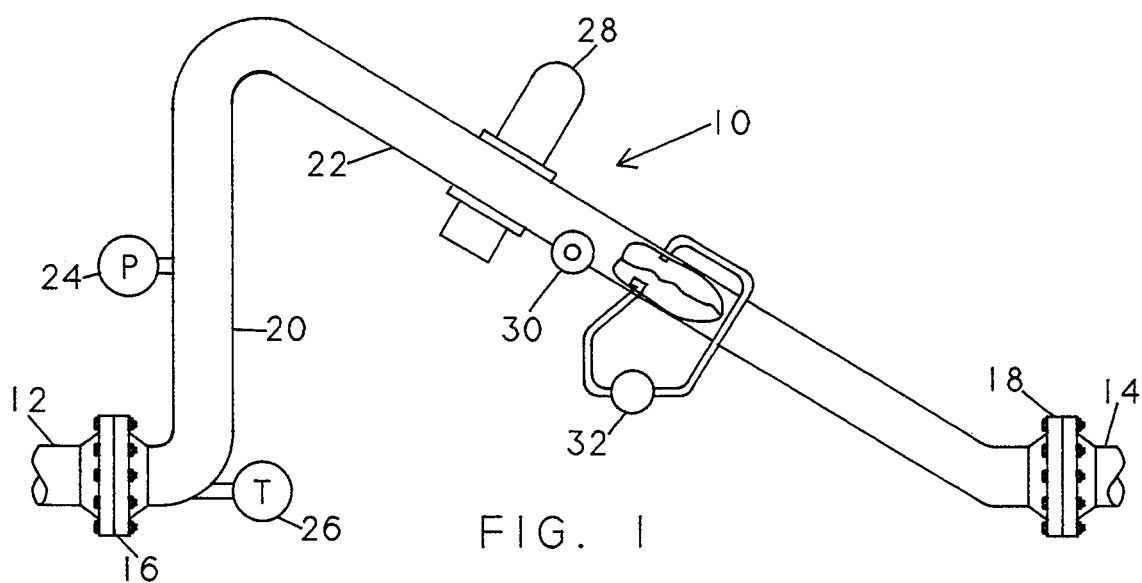
FIG. 1 is a side elevation, partially broken away, of a gas flow and liquid flow metering device according to the present invention.

An embodiment of an apparatus for performing the present invention is shown in schematic form in FIG. 1. The apparatus 10, which is an inclined stratifying device of the type mentioned above, is connected between pipes 12, 14 by known flange coupling means 16, 18. The stratifying portion includes integral riser pipe 20 and downwardly inclined pipe 22 of known internal diameter and cross sectional configuration. Pressure measuring means 24 and temperature sensing means 26 are shown connected to the riser to sense the pressure and temperature, respectively, of the fluid mixture in the pipe. A first density measuring means 28 is mounted on the inclined pipe substantially normal to the surface of the liquid flowing therethrough to determine the average density of the fluid stream in the inclined pipe segment 22. A second density measuring means 30 is mounted in the inclined pipe transverse to the axis of the pipe, but positioned to be below the surface of the liquid flowing therein, to determine the density of the liquid, with any entrained gas, flowing in the lower portion of the inclined pipe. Differential pressure sensing means 32, with probes above and below the flowing liquid, determine the dynamic head of the liquid, with any entrained gas, flowing in the lower portion of the inclined pipe 22.

The following detailed discussion describes how the liquid flow and gas flow rates are determined using the present invention. The measurement of pressure and temperature, with the knowledge of thermodynamic properties of the fluid mixture's liquid and gas components, enable the depth of the liquid, with any entrained gas, in the inclined flow line section to be calculated from the average density measurement utilizing the following equation:

$$l = \frac{\rho_{avg} - \rho_{gas}}{\rho_{liqg} - \rho_{gas}}$$

in which:

l = depth of the liquid (with entrained gas).

D = inside diameter of the pipe.

$\rho_{avg}$ = average density of fluid flowing down the inclined pipe section, measured by means 28 in a plane oriented perpendicular to the axis of the inclined pipe.

$\rho_{gas}$ = density of the gas at the pressure and temperature of the flowing fluid.

$\rho_{liq-g}$ = density of liquid (with entrained gas) measured via means 30 in a horizontal plane oriented perpendicular to pipe at an elevation immediately upstream of the dynamic head probe inlet.

Figure 2:
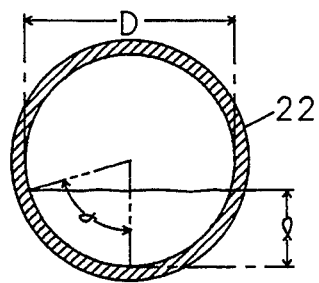
FIG. 2 is a representative cross section used to explain certain computations in the present invention.

The cross sectional area of the inclined section occupied by the liquid, containing some entrained gas, can now be determined if the configuration of the cross section is known. For example, consider an inclined section with a circular cross-sectional area. This is illustrated in FIG. 2. The angle $\alpha$, which indicates the radial portion of the inclined section occupied by the liquid with entrained gas, is determined from the equation:

$$\alpha = \arccos\left(\frac{D - 2l}{D}\right)$$

and the area occupied by the liquid with entrained gas is:

$$A_{liq} = \frac{D^2}{2}(\alpha - \cos\alpha \sin\alpha)$$

The velocity of the liquid with entrained gas, $V_{liq-g}$, is determined by the measurement of the dynamic head via means 32 from the relationship:

$$\Delta P_{dyn} = \tfrac{1}{2}\rho_{liq-g}V_{liq-g}^2$$

in which $\Delta P_{dyn}$ denotes the dynamic head measurement. Rearranging gives $$V_{liq-g} = \left(\frac{2\Delta P_{dyn}}{\rho_{liq-g}}\right)^{\frac{1}{2}}$$

Therefore, the volumetric liquid rate (with entrained gas), $Q_{liq-g}$ is $$Q_{liq-g} = A_{liq-g} V_{liq-g}$$

Correcting for the gas entrained in the liquid, $$X_{gas-entr} = \frac{\rho_{liq-g} - \rho_{gas}}{\rho_{liq} - \rho_{gas}}$$

$$Q_{liq} = (1 - X_{gas-entr})Q_{liq-g}$$

in which $X_{gas-entr}$ = "entrained" gas fraction
$Q_{liq}$ = corrected volumetric liquid flow rate.
$\rho_{liq}$ = density of liquid at temperature and pressure of flowing fluid.

Similarly, the total gas fraction, $X_{gas}$, is obtained from:

$$X_{gas} = \frac{\rho_{avg} - \rho_{liq}}{\rho_{gas} - \rho_{liq}}$$

and the total gas rate, $Q_{gas}$, is defined by $$Q_{gas} = \left(\frac{X_{gas}}{1 - X_{gas}}\right) Q_{liq}$$

All measurements are made by industry accepted passive means.

The design evolved from considering alternative ways to determine liquid flow rate using liquid stratification within downwardly inclined flow line sections.

The use of devices, such as pitot tubes, to determine the dynamic head of the flow stream is a classic measurement that has been proven an accurate way to determine the velocity of a flowing stream.

The present invention may be subject to many modifications and changes, which will occur to those skilled in the art, without departing from the spirit or essential characteristics thereof. Therefore the present embodiment should be considered in all respects as illustrative and not restrictive of the scope of the present invention as defined by the appended claims.

We claim:

1. A method for measuring the liquid flow rate and the gas flow rate of a fluid containing these two phases comprising the steps of:
    stratifying said fluid by flowing down an incline;
    measuring the pressure and temperature of said fluid;
    measuring the density of the total fluid;
    measuring the dynamic head of the bulk liquid; and
    measuring the density of the liquid portion only of the fluid to positively determine liquid and gas flow rates of a fluid mixture having gas and liquid phases present.

2. An apparatus for measuring both the liquid flow rate and the gas flow rate in a fluid containing both liquid and gas, said apparatus comprising:
    inclined pipe means to stratify the fluid flow;
    means to measure the temperature and pressure of the fluid flowing in said pipe;
    differential pressure means adapted to measure the liquid dynamic head;
    first densitometer means to measure the density of the total fluid; and
    second densitometer means to measure the density of the liquid portion of the fluid, whereby the flow rates of both the gas portion and the liquid portion of the fluid can be determined.

* * * * *